US 7,640,470 B2

(12) United States Patent
Lammel et al.

(10) Patent No.: US 7,640,470 B2
(45) Date of Patent: Dec. 29, 2009

(54) META-DATA DRIVEN TEST-DATA GENERATION WITH CONTROLLABLE COMBINATORIAL COVERAGE

(75) Inventors: Ralf Lammel, Redmond, WA (US); Wolfram Schulte, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 670 days.

(21) Appl. No.: 11/507,416

(22) Filed: Aug. 21, 2006

(65) Prior Publication Data

US 2008/0065941 A1    Mar. 13, 2008

(51) Int. Cl.
G01R 31/28 (2006.01)
G06F 11/00 (2006.01)
G06F 17/28 (2006.01)

(52) U.S. Cl. .............................. 714/724; 714/25; 704/4
(58) Field of Classification Search ....................... None
See application file for complete search history.

(56) References Cited

U.S. PATENT DOCUMENTS

| 5,754,760 | A | 5/1998 | Warfield | 395/183.4 |
|---|---|---|---|---|
| 5,913,023 | A | 6/1999 | Szermer | 395/183.4 |
| 5,918,037 | A | 6/1999 | Tremblay et al. | 395/500.03 |
| 6,148,427 | A | 11/2000 | Sherwood et al. | 714/738 |
| 6,460,147 | B1 | 10/2002 | Cox | 714/38 |
| 6,536,036 | B1 | 3/2003 | Pavela | 717/125 |
| 6,907,546 | B1 | 6/2005 | Haswell et al. | 714/38 |
| 6,944,848 | B2 | 9/2005 | Hartman et al. | 717/124 |
| 7,024,589 | B2 | 4/2006 | Hartman et al. | 714/32 |
| 7,103,542 | B2 * | 9/2006 | Doyle | 704/231 |
| 7,536,370 | B2 * | 5/2009 | Masurkar | 706/47 |
| 2003/0046312 | A1 | 3/2003 | Hartley | 707/203 |
| 2003/0046609 | A1 | 3/2003 | Farchi et al. | 714/30 |
| 2003/0046613 | A1 | 3/2003 | Farchi et al. | 714/38 |
| 2003/0051188 | A1 | 3/2003 | Patil | 714/4 |
| 2003/0098879 | A1 | 5/2003 | Mathews | 345/762 |
| 2003/0125945 | A1 * | 7/2003 | Doyle | 704/246 |
| 2003/0126517 | A1 | 7/2003 | Givoni et al. | 714/46 |
| 2003/0229825 | A1 | 12/2003 | Barry et al. | 714/38 |
| 2004/0064268 | A1 | 4/2004 | Gillenwater et al. | 702/40 |
| 2004/0194063 | A1 | 9/2004 | Pereira | 717/124 |
| 2004/0267485 | A1 | 12/2004 | Penov et al. | 702/119 |
| 2005/0166094 | A1 | 7/2005 | Blackwell et al. | 714/38 |
| 2005/0197836 | A1 | 9/2005 | Cohen et al. | 704/251 |
| 2006/0064570 | A1 | 3/2006 | De Savoia | 712/227 |
| 2006/0085132 | A1 | 4/2006 | Sharma et al. | 702/1 |

OTHER PUBLICATIONS

Duncan, A.G., et al., "Using attributed grammars to test designs and implementations," *IEEE*, 1981, 170-178.
Lämmel, R., et al., "Controllable combinatorial coverage in grammar-based testing," downloaded from the Internet on or about Apr. 26, 2006, 18 pages.
Wu, Y., et al., "UML-based integration testing for component-based software," downloaded from the Internet on or about Apr. 26, 2006, 10 pages.
Zaytsev, V.V. Dr., "Combinatorial Test Set Generation: Concepts, Implementation, Case Study", Jun. 22, 2004, 16 pages.

* cited by examiner

*Primary Examiner*—Christine T Tu
(74) *Attorney, Agent, or Firm*—Woodcock Washburn LLP

(57) ABSTRACT

Generation of test data for systems having functionality subject to a grammar or other sort of meta-data is automated by a controlled combinatorial approximation of naïve combinatorial coverage. A suite of control mechanisms are applied to an algorithm that generates test data to provide well-defined and understandable approximations of full combinatorial coverage.

20 Claims, 3 Drawing Sheets

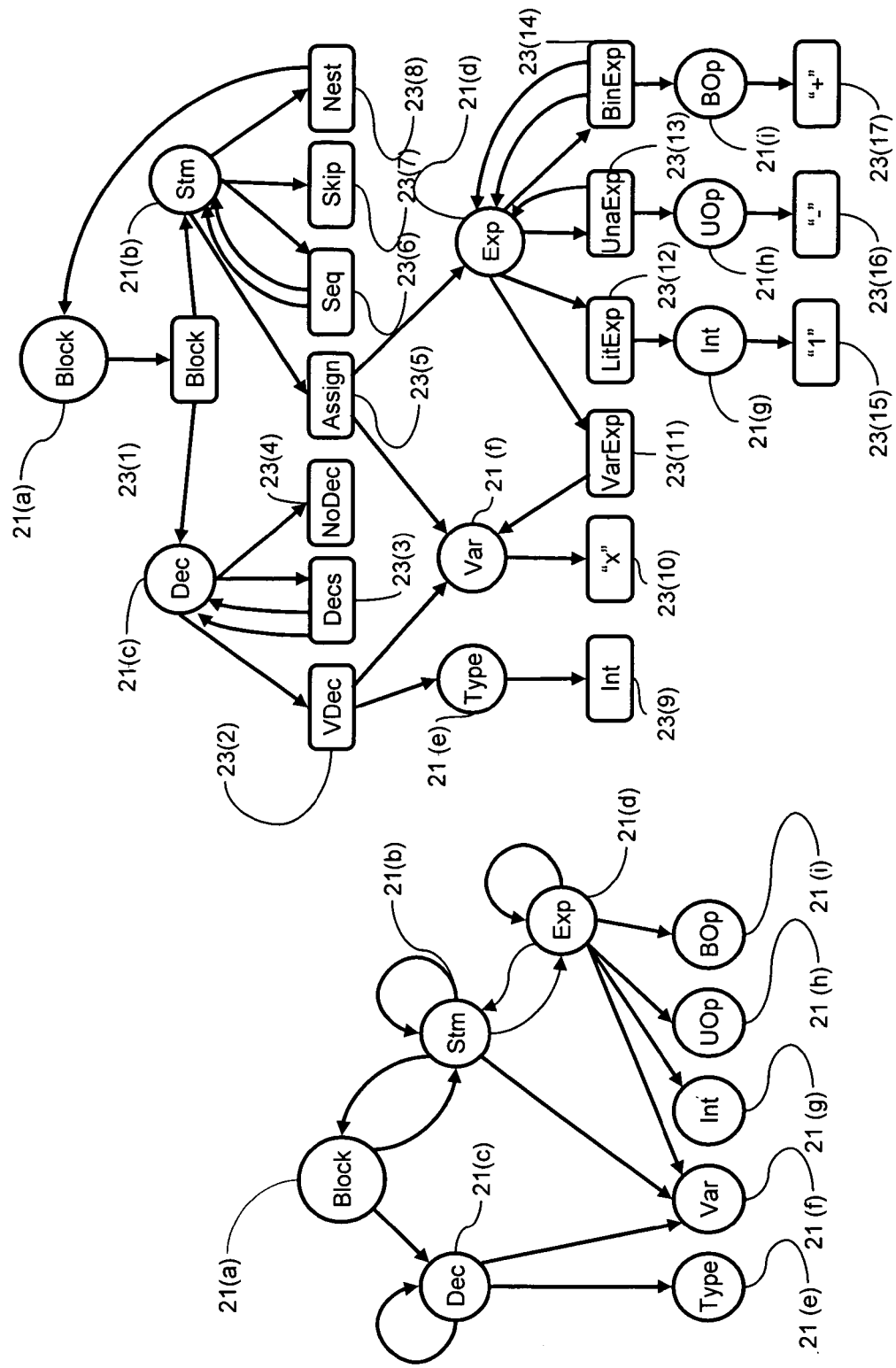

//META-DATA DRIVEN TEST-DATA GENERATION WITH CONTROLLABLE COMBINATORIAL COVERAGE

COPYRIGHT NOTICE AND PERMISSION

A portion of the disclosure of this patent document may contain material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice shall apply to this document: Copyright ©2006, Microsoft Corp.

TECHNICAL FIELD

The various embodiments of this disclosure relate generally to the testing of software, and more specifically to a combinatorial approach for testing grammar driven functionality in software.

BACKGROUND

The development of software products is a time-consuming, detail oriented, and resource intensive process. One important aspect of this process is the testing of software by executing the software to determine errors in the program or application. The object of testing is to verify the proper functioning of the software. In a typical testing program, test data is used to determine whether the program is functioning properly. One of the challenges presented by software testing is that the number of errors in a software program may be quite large and difficult to detect. To find potential errors; a test engineer may be required to devise complicated test cases and systematic exploration of the value domains for test data. Numerous methodologies have been employed in the testing of software.

One way of testing the software is to write a plurality of test cases for the software. A test case is typically a sequence of actions implemented by the software being tested and associated with the required inputs and desired outputs to identify an error in the software. The collection of test cases is usually referred to as test suite. Typically the objective of the test suite is to determine whether the software implementation conforms to the specification for the software. It is common for test suites to be created and applied during the development of the software products. One methodology is to enter the test data manually using an input device. This methodology has the disadvantage of being time-consuming, expensive, and susceptible to data entry mistakes. Another methodology is to automate the generation of test data for each test case. For example, the software under test may be modeled as a finite state machine that includes states and transitions between states. Information specifying when a transition is to be implemented and the effect of implementing the transition is also included. One of the difficulties of implementing automated testing programs is that the number of test cases may grow to a very large number, making the implementation of the tests time-consuming and resource and intensive.

These problems are compounded when testing large, complex, virtual machines. As used here, a virtual machine is software that isolates the application being used by the user from the computer. Versions of the virtual machine are written for various computer platforms, consequently any application written for the virtual machine can be operated on any of the platforms. Commonly used techniques for testing of virtual machines have a number of disadvantages. One drawback is that they typically operate on abstract models of the code and not actual implementation. Another disadvantage is that the testing only covers a subset of the constructs found in the virtual machine, and necessitates manual efforts to map the formal model onto the implementation. Techniques such as directed test case generation have been commonly used by virtual machine developers. Those manual testing techniques end up being expensive and slow due to the amount of human effort they entail.

Automatic test generation systems have been implemented where the coverage levels of tests are controlled by trading loss between the thoroughness of the test and the amount of time required to execute the test. One way in which this is been accomplished is to model the system under test as a finite state machine made up of interconnected models. The coverage level of each model is controlled to avoid generating paths that differ only by just that had been already concluded in other paths.

Enhanced context free grammars have been used as a means for generating test data. Such grammars may be used to create random samples of tests as well as to create complete tests. Production grammars have also been used for test generation. Production grammars can generate a variety of test cases and how those test cases should behave. These grammar based testing methodologies utilize stochastic test data generation. The generally accepted approach is to annotate a grammar with probabilistic weights on the productions and other hints. A test-data set is then generated using probabilistic production selection and potentially further heuristics. Stochastic approaches have been successfully applied to practical problems. The problem with these existing approaches is that they do not clearly quantify the degree of coverage achieved by the resulting test data. As long as randomized test-data generation is done in a pure manner, one may potentially refer to stochastic arguments when attempting the quantification of coverage. However, most practical test problems for meta-data-driven functionality require more control on the generation process.

For instance, randomized generation may need to be mixed with pair-wise testing in a certain way, or ingenious weights must be designed by the tester to make test-data generation terminate, or to express intents of coverage. Some state-of-the-art testing approaches do indeed provide some control mechanisms to this end. However, such control efforts make it even more difficult to obtain a clear understanding of coverage. The problem is basically that existing approaches lack a principled model for the suite of control mechanisms, which makes it difficult to apply them and anticipate their effect.

To summarize, current approaches for testing meta-data-driven functionality lack a fundamental and general notion of coverage, and they tend to provide suites of control mechanisms with ad-hoc justification and complex operational semantics.

SUMMARY

The methods, systems, and computer-readable media of this disclosure adopt an alternative approach to test-data generation. There is provided a methodology for obtaining substantial combinatorial coverage for testing meta-data driven functionality.

The methodology is implemented by an algorithm for bottom up test data generation with control mechanisms integrated into the basic algorithm.

A methodology for generating data for testing a system having a grammar or meta-data driven functionality includes generating test data in a controlled manner by identifying sorts and constructors associated with the grammar, generating a subset of all possible terms that can be constructed from said sorts and constructors, and composing test data sets from those terms.

BRIEF DESCRIPTION OF THE DRAWINGS

The foregoing concepts of meta-data driven test-data generation with controllable combinatorial coverage included in the Summary, as well as the following detailed description, are better understood when read in conjunction with the appended drawings. For the purpose of illustrating the claimed subject matter, there is shown in the drawings example constructions of various embodiments; however, the embodiments are not limited to the specific methods and instrumentalities disclosed. In the drawings:

FIG. 3 is a sort graph; and

FIG. 4 is a constructor graph

DETAILED DESCRIPTION

Certain specific details are set forth in the following description and figures to provide a thorough understanding of various embodiments of the invention. Certain well-known details often associated with computing and software technology are not set forth in the following disclosure to avoid unnecessarily obscuring the various embodiments of the invention. Further, those of ordinary skill in the relevant art will understand that they can practice other embodiments of the invention without one or more of the details described below. Finally, while various methods are described with reference to steps and sequences in the following disclosure, the description as such is for providing a clear implementation of embodiments of the invention, and the steps and sequences of steps should not be taken as required to practice this invention.

Example Computing Environment

Figure 1:
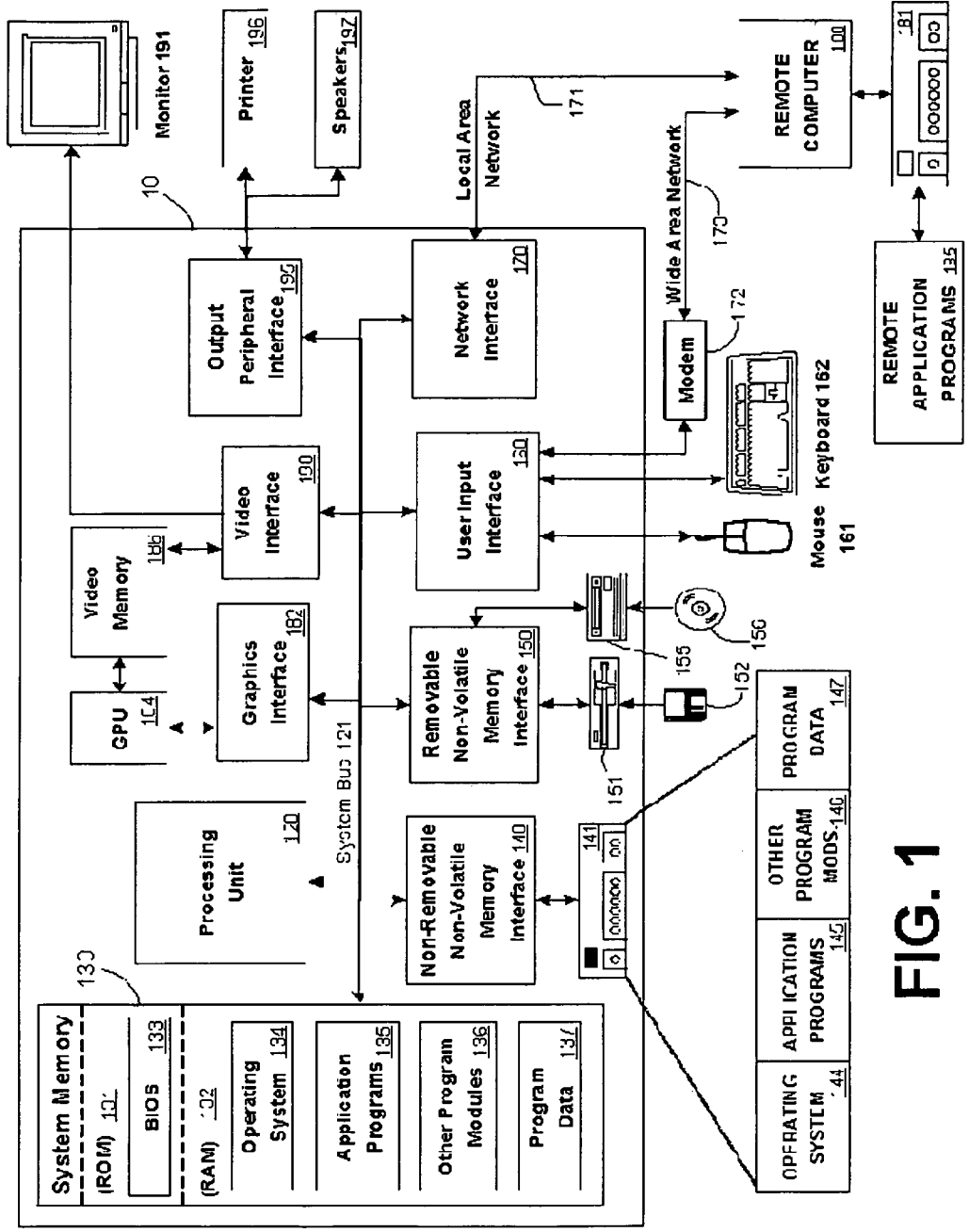
FIG. 1 is a block diagram representing an exemplary computing device suitable for use in conjunction with meta-data driven test-data generation with controllable combinatorial coverage.

Referring to FIG. 1, shown is a block diagram representing an exemplary computing device suitable for use in conjunction with implementing the processes described above. For example, the computer executable instructions that carry out the processes and methods for extending hierarchical synchronization (sync) scopes to non-hierarchical scenarios may reside and/or be executed in such a computing environment as shown in FIG. 1. The computing system environment 220 is only one example of a suitable computing environment and is not intended to suggest any limitation as to the scope of use or functionality of the invention. Neither should the computing environment 220 be interpreted as having any dependency or requirement relating to any one or combination of components illustrated in the exemplary operating environment 220. For example a computer game console may also include those items such as those described below for use in conjunction with implementing the processes described above.

Aspects of the invention are operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set-top boxes, programmable consumer electronics, network PCs, minicomputers, mainframe computers, distributed computing environments that include any of the above systems or devices, and the like.

Aspects of the invention may be implemented in the general context of computer-executable instructions, such as program modules, being executed by a computer. Generally, program modules include routines, programs, objects, components, data structures, etc. that perform particular tasks or implement particular abstract data types. Aspects of the invention may also be practiced in distributed computing environments where tasks are performed by remote processing devices that are linked through a communications network. In a distributed computing environment, program modules may be located in both local and remote computer storage media including memory storage devices.

An exemplary system for implementing aspects of the invention includes a general purpose computing device in the form of a computer 241. Components of computer 241 may include, but are not limited to, a processing unit 259, a system memory 222, and a system bus 221 that couples various system components including the system memory to the processing unit 259. The system bus 221 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, the Peripheral Component Interconnect (PCI) bus also known as Mezzanine bus, as well as its successor, the PCI-Express standard.

Computer 241 typically includes a variety of computer-readable media. Computer-readable media can be any available media that can be accessed by computer 241 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 241. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The system memory 222 includes computer storage media in the form of volatile and/or nonvolatile memory such as read only memory (ROM) 223 and random access memory (RAM) 260. A basic input/output system 224 (BIOS), containing the basic routines that help to transfer information between elements within computer 241, such as during startup, is typically stored in ROM 223. RAM 260 typically contains data and/or program modules that are immediately accessible to and/or presently being operated on by processing unit 259. By way of example, and not limitation, FIG. 1 illustrates operating system 225, application programs 226, other program modules 227, and program data 228.

The computer 241 may also include other removable/non-removable, volatile/nonvolatile computer storage media. By way of example only, FIG. 1 illustrates a hard disk drive 238 that reads from or writes to non-removable, nonvolatile magnetic media, a magnetic disk drive 239 that reads from or writes to a removable, nonvolatile magnetic disk 254, and an optical disk drive 240 that reads from or writes to a removable, nonvolatile optical disk 253 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 238 is typically connected to the system bus 221 through a non-removable memory interface such as interface 234, and magnetic disk drive 239 and optical disk drive 240 are typically connected to the system bus 221 by a removable memory interface, such as interface 235.

The drives and their associated computer storage media discussed above and illustrated in FIG. 1, provide storage of computer-readable instructions, data structures, program modules and other data for the computer 241. In FIG. 1, for example, hard disk drive 238 is illustrated as storing operating system 258, application programs 257, other program modules 256, and program data 255. Note that these components can either be the same as or different from operating system 225, application programs 226, other program modules 227, and program data 228. Operating system 258, application programs 257, other program modules 256, and program data 255 are given different numbers here to illustrate that, at a minimum, they are different copies. A user may enter commands and information into the computer 241 through input devices such as a keyboard 251 and pointing device 252, commonly referred to as a mouse, trackball or touch pad. Other input devices (not shown) may include a microphone, joystick, game pad, satellite dish, scanner, or the like. These and other input devices are often connected to the processing unit 259 through a user input interface 236 that is coupled to the system bus, but may be connected by other interface and bus structures, such as a parallel port, game port or a universal serial bus (USB). A monitor 242 or other type of display device is also connected to the system bus 221 via an interface, such as an insecure or secure video interface 232. An exemplary secure video standard would be the High-Definition Multimedia Interface (HDMI) standard. In addition to the monitor, computers may also include other peripheral output devices such as speakers 244 and printer 243, which may be connected through a output peripheral interface 233.

The computer 241 may operate in a networked environment using logical connections to one or more remote computers, such as a remote computer 246. The remote computer 246 may be a personal computer, a server, a router, a network PC, a peer device or other common network node, and typically includes many or all of the elements described above relative to the computer 241, although only a memory storage device 247 has been illustrated in FIG. 1. The logical connections depicted in FIG. 1 include a local area network (LAN) 245 and a wide area network (WAN) 249, but may also include other networks. Such networking environments are commonplace in offices, enterprise-wide computer networks, intranets and the Internet.

When used in a LAN networking environment, the computer 241 is connected to the LAN 245 through a network interface or adapter 237. When used in a WAN networking environment, the computer 241 typically includes a modem 250 or other means for establishing communications over the WAN 249, such as the Internet. The modem 250, which may be internal or external, may be connected to the system bus 221 via the user input interface 236, or other appropriate mechanism. In a networked environment, program modules depicted relative to the computer 241, or portions thereof, may be stored in the remote memory storage device. By way of example, and not limitation, FIG. 1 illustrates remote application programs 248 as residing on memory device 247. It will be appreciated that the network connections shown are exemplary and other means of establishing a communications link between the computers may be used.

It should be understood that the various techniques described herein may be implemented in connection with hardware or software or, where appropriate, with a combination of both. Thus, the methods and apparatus of the invention, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computer, the machine becomes an apparatus for practicing the invention. In the case of program code execution on programmable computers, the computing device generally includes a processor, a storage medium readable by the processor (including volatile and non-volatile memory and/or storage elements), at least one input device, and at least one output device. One or more programs that may implement or utilize the processes described in connection with the invention, e.g., through the use of an API, reusable controls, or the like. Such programs are preferably implemented in a high level procedural or object oriented programming language to communicate with a computer system. However, the program(s) can be implemented in assembly or machine language, if desired. In any case, the language may be a compiled or interpreted language, and combined with hardware implementations.

Although exemplary embodiments may refer to utilizing aspects of the invention in the context of one or more stand-alone computer systems, the invention is not so limited, but rather may be implemented in connection with any computing environment, such as a network or distributed computing environment. Still further, aspects of the invention may be implemented in or across a plurality of processing chips or devices, and storage may similarly be effected across a plurality of devices. Such devices might include personal computers, network servers, handheld devices, supercomputers, or computers integrated into other systems such as automobiles and airplanes.

In light of the diverse computing environments that may be built according to the general framework provided in FIG. 1, the systems and methods provided herein cannot be construed as limited in any way to a particular computing architecture. Instead, the invention should not be limited to any single embodiment, but rather should be construed in breadth and scope in accordance with the appended claims.

Software engineers typically test programs by creating a test suite, which comprise set of test cases. Each test case is a description of a single test input to the program, associated with a description of the properties that the corresponding output is expected to have.

Figure 2:
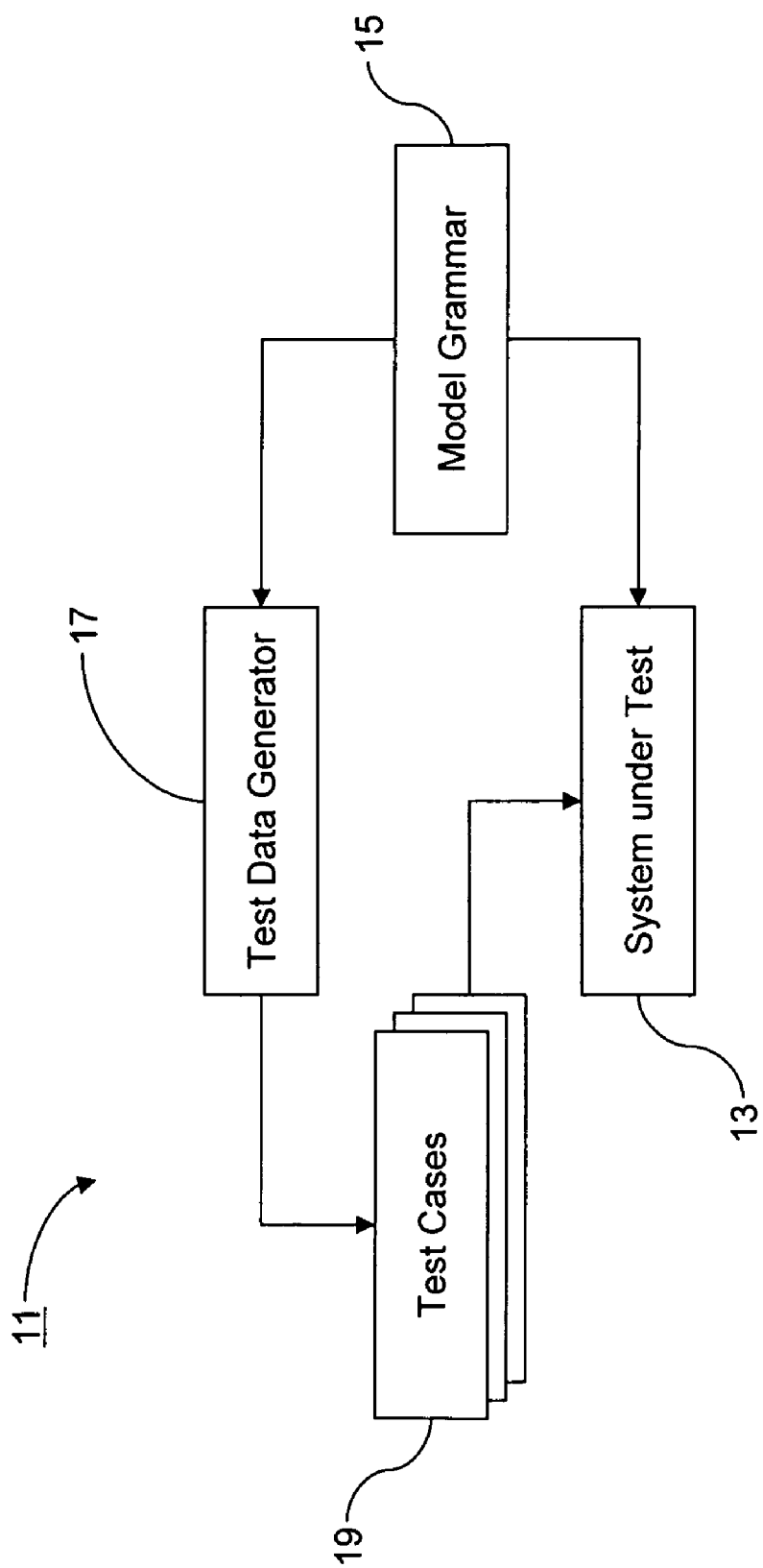
FIG. 2 is a schematic representation of a system for meta-data driven test-data generation with controllable combinatorial coverage.

Illustrated in FIG. 2 is a high level schematic of the system 11 for generating test data in accordance with one embodiment. The system includes a system under test 13 that may be a virtual machine, a language implementation, a serialization framework for objects, or a Web Service protocol with its schema-defined requests and responses or any other type of system with grammar driven functionality. Associated with the system under test 13 is a grammar and a model of the grammar 15 that may include context-free grammars, algebraic signatures, XML schemas, or other sorts of meta-data. The system also includes a test data generator 17. The test data generator 17 takes as input a model of the grammar of the system under test 13. The test data generator 17 creates a plurality of test cases 19 that are used as inputs by the system under test 13. The test cases 19 correspond to a sequence of actions being performed upon the system under test 13 together with the required inputs (test data) and desired outputs with the objective of finding an error in the system. The model of the grammar also describes a mapping from input values to properties for each input element, the model defines what properties an execution on that input should satisfy. The test data generator 17 automatically generates inputs to the system under test 13.

The testing of grammar dependent software is challenging. Software with grammar-based functionality usually operates on data with complex structure. One way of testing grammar dependent software is to generate all possible combinations of test data (combinatorial testing) to be provided as input to the system under test 13. For many systems the size of the data set becomes unworkably high as illustrated below.

The following example illustrates the operation of the system 11 using a simple model grammar 15. The system under test 13 may be a code generator or an interpreter. In this example, the grammar that specifies the syntax of an expression language is used. The grammar has the following constructors for expression forms:

*iexp:int→exp*

*uexp:uop×exp→exp*

*bexp:exp×bop×exp→exp*

The expression language has the sorts exp (for expressions), int (for integer literals), uop (for unary operators), and bop (for binary infix operators).

The expression language may be defined in a C# Test Data Generator as follows:

```
Exp = BinExp ( Exp , BOp, Exp ) // Binary expressions
    | UnaExp ( UOp , Exp ) // Unary expressions
    | LitExp ( Int ) ; // Literals as expressions
BOp = "+" ; // A binary operator
UOp = "–" ; // A unary operator
Int = "1" ; // An integer literal
```

This grammar ($G_a$) may be executed with the Test Data Generator 17 to generate all terms over the grammar in the order of increasing depth. The following C# code applies The Test Data Generator 17 programmatically to the above grammar (stored in a file "Expression.geno") complete with a depth limit for the terms. The for each loop iterates over the generated test-data set such that the terms are simply printed.

```
using Microsoft.AsmL.Tools.Geno;
public class ExpressionGenerator {
    public static void Main (string[ ] args) {
        foreach(Term t in new Geno(Geno.Read("Expression.geno"), 4))
            Console.WriteLine(t);
    }
}
```

The combinatorial complexity of the grammar can be described as follows:

there is 1 term of sort Exp with depth 2: LitExp("1");

... 2 terms ... with depth 3:

UnaExp ("–",LitExp("1")

BinExp (LitExp("1"), "+", LitExp("1"));

... 10 terms ... with depth 4;

hence, there are 13 terms of sort Exp up to depth 4;

the number of terms explodes for depth 6-7.

Table 1 below illustrates the number of terms in the grammar $G_a$ with increasing depth.

TABLE 1

| Depth | $G_a$ |
|---|---|
| 1 | 0 |
| 2 | 1 |
| 3 | 2 |
| 4 | 10 |
| 5 | 170 |
| 6 | 33,490 |
| 7 | — |

The preceding numbers relate to expression terms only, and neglect the context in which such expressions may occur in a nontrivial language. As shown in Table 2 below, the number of terms increases dramatically for slightly expanded grammars. In the table below the grammar $G_a$ is extended by providing three integer literals (0, 1, 2), 2 unary operators ('+', '–'), and 4 binary operators ('+', '–', '*', '/'), and is extended grammar is denoted as $G_b$. The grammar $G_c$, further adds variables as expression forms along with three variable names (x, y, z). The grammar $G_d$, further adds typical expression forms of object oriented language such as C#.

TABLE 2

| Depth | $G_a$ | $G_b$ | $G_c$ | $G_d$ |
|---|---|---|---|---|
| 1 | 0 | 0 | 0 | 1 |
| 2 | 1 | 3 | 6 | 29 |
| 3 | 2 | 42 | 156 | 9,367 |
| 4 | 10 | 8,148 | 105,144 | 883,148,861 |
| 5 | 170 | 268,509,192 | — | — |
| 6 | 33,490 | — | — | — |
| 7 | — | — | — | — |

Full combinatorial exploration of a grammar which has nonterminals for programs, declarations and statements—in addition to expressions that are used in statement contexts cannot be explored for non-trivial depths because of the large number of data sets that are necessary to exhaustively test the system (explosion problem). The concept of explosion relates to the fact that the number of terms becomes very large with the finite increment, and that the number of generated test cases becomes unworkable within a small number of depth layers explored. However, combinatorial coverage can be approximated in a number of ways by taking advantage of some properties of the underlying grammar of the system under test 13.

Understanding the properties of the Grammar 15 is useful for two purposes: (i) for the implementation of test-data generation through Test Data Generator 17; and as a feedback mechanism for the test engineer who needs to understand the combinatorial complexity of a grammar in the process of modeling the test scenario.

The properties are described in terms of sort graph shown in FIG. 3 and a constructor graphs shown in FIG. 4, which can be derived from any grammar. The nodes 21 (a) through 21(i) in the sort graph are the sorts, while an edge from one sort to another ($\sigma$ to $\sigma'$) means that the sort $\sigma'$ occurs as argument sort of some constructor of sort $\sigma$. The constructor graph (FIG. 4) provides a more detailed view with two kinds of nodes, namely constructors 23(1)-23(17) and sorts 21(a)-21(i). There are edges from each sort to all of its constructors. There is one edge for each argument of a constructor—from the constructor node to the node of the argument's sort. The Test Data Generator 17 compiles the input grammar into an internal representation containing the sort and constructor graph. It uses this graph to direct the generation of objects.

Reachability of sorts from other sorts is extractable from the sort graph. Sort $\sigma'$ is reachable from $\sigma$, denoted by $\rho_\Sigma(\sigma, \sigma')$, if there is a path from $\sigma$ to $\sigma'$. In similarity to terminated context-free grammars, all sorts are required to be reachable from root, except perhaps root itself.

Recursiveness of sorts can be defined based on reachability. A sort $\sigma$ is recursive, denoted by $\mu(\sigma)$, if $\rho_\Sigma(\sigma, \sigma)$. (For a mutually recursive sort, there is a path through other sorts, thereby uncovering a recursive clique. For a directly recursive sort, there is a self-edge.)

Dominance is a stricter form of reachability. Sort $\sigma$ dominates $\sigma'$, denoted as $\delta_\Sigma(\sigma, \sigma')$, if all paths from root to $\sigma'$ go through $\sigma$. (root trivially dominates every sort.) If $\sigma'$ is reachable from $\sigma$, then there is a distance between the sorts, denoted as $\epsilon_\Sigma(\sigma, \sigma')$, which is defined as the shortest path from $\sigma'$ to $\sigma'$.

Basic Algorithm for Test-Data Generation There are two overall options for test-data generation: top-down and bottom-up. The top-down approach would lend itself to a recursive formulation as follows. Given a depth and a sort, the recursive function for test-data generation constructs all terms of the given sort by applying all possible constructors to all possible combinations of subterms of smaller depths; the latter are obtained through recursive calls.

A bottoms-up approach may be implemented by the algorithm illustrated below.

Arguments
Signature $\Sigma$ with root sort, root
Depth $d \geq 1$ for combinatorial coverage
Result Test-data set T that covers $\Sigma$ up to depth d
Variables
$at_\sigma^i$—terms of sort $\sigma$ at depth i (i.e., $T_\Sigma^i(\sigma)$)
kids—an array of sets of terms for building new terms
len—current length of the kids array
Notation
$\Sigma_\sigma$—the set of constructors from $\Sigma$ that are of sort $\sigma$
args(c)—the sequence of argument sorts for the constructor c
kids[1], kids[2], . . . —array subscripting
combine(c, kids, len)—build terms with constructor c and subterms from kids
Algorithm

```
for i = 1,...,d do begin                              // Term construction in increasing depth
    for each σ in Σ do begin                          // Iterate over all sorts
        at_σ^i := ∅;
        if d − εΣ(root, σ) ≥ i then begin             // Skip depth depending on distance from root
            if i ≥ θ_Σ(σ) then begin                  // Skip depth if threshold has not been reached yet
                for each c in Σ_σ do begin            // Iterate over all constructors of sort
                    len := 0;
                    for each a in args(c) do begin    // Iterate over all arguments of c
                        len := len + 1;
                        kids[len] := at_a^1 ∪ ... ∪ at_a^{i−1};   // Determine argument terms
                    end;
                    at_σ^i := at_σ^i ∪ combine(c, kids, len);    // Build and store terms
                end;
            end;
        end;
    end;
end;
T := at_root^1 ∪ ... ∪ at_root^d;                     // Compose result
```

This formulation is only slightly more complex than a top-down recursive formulation, while it offers one benefit. That is, an implementation (using reference semantics for terms) can immediately use sharing for the constructed terms; each term construction will be effectively a constant-time operation then (given that the arities of constructors are bounded). It is true that the top-down approach could employ some sort of memorization so that sharing is achieved, too. The bottom-up approach also happens to provide useful feedback to the test engineer. That is, the various sorts are inhabited in increasing depth; so "one can observe explosion", right when it happens.

The combinatorial construction of terms is denoted by combine(c, kids, len). Initially, this operation calculates the Cartesian product (all possible ordered pairs) over the term sets for the argument sorts of a constructor (i.e., over kids). However, a legal combination must involve at least one term of depth i−1 (as opposed to 1, . . . , i−2); otherwise. a term of depth I is not constructed. Controlled combinatorial coverage caters for options other than the Cartesian product. Hence, combine(c, kids, len) is subject to redefinition by dependence control as described below.

The methodology of this disclosure provides a number of control mechanisms to avoid the explosion problem while still generating substantially comprehensive test data. The basic algorithm, as presented above, may be amended locally for each mechanism. The control mechanisms are:

Depth control—limit depth of terms; not just for the root sort.

Recursion control—limit nested applications of recursive constructors.

Balance control—limit depth variation for argument terms.

Dependence control—limit combinatorial exhaustion of argument domains.

Construction control—constrain and enrich term construction.

Order sequence control—unordered, ignore order of appearance if possible; and

Duplicate control—ignore duplicates (if possible).

Order sequence and duplicate controls are convenient specializations of the fundamental formalisms applied to lists.

Depth Control With d as the limit for the depth of terms of the root sort, the depth limits for all the other sorts are implied. For any given $\sigma$, the implied depth limit is $d-\epsilon_\Sigma(\text{root}, \sigma)$, and the actual depth may actually vary per occurrence of the sort. This fact suggests a parameterization of the basic algorithm such that a depth limit, $d_\sigma$, can be supplied explicitly for each sort $\sigma$. The algorithm evolves as follows:

Before refinement
if $d-\epsilon_\Sigma(\text{root}, \sigma) \geq i$ then begin //Skip depth depending on distance from root
After refinement
if $d_\sigma \geq i$ then begin //Skip depth depending on sort-specific limit All but the depth limit for the root sort are considered optional. (Per notation, d becomes $d_{root}$.) One should notice that per-sort limits can only lower the actual depth limit beyond the limit that is already implied by the root limit. More generally, the depth limit for any sort is also constrained by its dominators. Hence, the explicit depth limits may be assumed in accordance with the following limitations:

$$\forall \sigma, \sigma' \epsilon \cdot \delta_\Sigma(\sigma, \sigma') \Rightarrow d_{\sigma'} \leq d_\sigma - \epsilon_\Sigma(\sigma, \sigma')$$

Any control mechanism that works per sort, works per argument position of constructors, too. The control-parameter value for a sort may be viewed as the default for the control parameters for all argument positions of the same sort. Let us generalize control depth in this manner. The algorithm may be modified by a depth limit parameter, $d_{c,j}$, where c is a constructor and j=1, ..., arity(c). The algorithm evolves as follows:

Before refinement:
kids[len]:=$at_a^1 \cup \ldots \cup at_a^{i-1}$; //Determine argument terms
After refinement:
kids[len]:=$at_a^1 \cup \ldots \cup at_a^{min(i-1,d_{c,len})}$; //Determine argument terms Some argument position of a given sort may exercise a given depth, whereas others do not. For this reason that the above refinement needs to be precise about indexing sets of terms.

Recursion Control Depth control allows the programmer to assign low priority to sorts in a way that full combinatorial coverage is consistently relaxed for subtrees of these sorts. Recursion control allows programmers to assign low priority to intermediary sorts only until combinatorial exploration hits sorts of interests. To this end, the recursive depth of terms of intermediary sorts can be limited. The recursive depth of a term t for a given sort $\sigma$ is denoted as $\text{rdepth}_{\Sigma,\sigma}(t)$ and defined as follows:

rdepth$_{\Sigma,\sigma}$(c)=if $c \epsilon \Sigma_\sigma$ then 1 else 0
rdepth$_{\Sigma,\sigma}$(c($t_1, \ldots, t_n$))=if $c \epsilon \Sigma_\sigma$ then 1+ts else ts
where ts=max({rdepth$_{\Sigma,\sigma}$($t_1$), ..., rdepth$_{\Sigma,\sigma}$($t_n$)})

Recursion control is enabled by further parameterization of the algorithm. The limits for recursive depth amount to parameters $r_{c,j}$ where c is a constructor and j=1, ..., arity(c). An unspecified limit is seen as ∞. The algorithm evolves as follows:

Before refinement:
kids[len]:=$at_a^1 \cup \ldots \cup at_a^{min(i-1,d_{c,len})}$; //Determine argument terms
After refinement:
kids[len]:={$t \epsilon at_a^1 \cup \ldots \cup at_a^{min(i-1,d_{c,len})} | \text{rdepth}_{\Sigma,\sigma}(t) \leq r_{c,len}$};

The actual term traversals for the calculation of (recursive) depth can be avoided in an efficient implementation by readily maintaining recursive depth and normal depth as term properties along with term construction.

Balance Control

Depth and recursion control cannot be used in cases where terms of ever-increasing depth are needed (without causing explosion). This scenario is enabled by balance control, which allows us to limit the variation on the depth of argument terms. Normally, when a programmer builds terms of depth i, the programmer consider argument terms of depth 1, ... i-1. An extreme limitation would be to only consider terms of depth i-1. In this case, the constructed terms were balanced—hence, the name: balance control. In this case, it is also easy to see that the number of terms would only grow by a constant factor. Balance control covers the full spectrum of options—with i-1 being one extreme and 1, ..., i-1 the other. The algorithm may be made subject to parameters of limits, $b_{c,j} > 1$, where c is a constructor and j= 1, ..., arity(c). Again, this parameter is trivially put to work in the algorithm by adapting the step for argument terms. An unspecified limit is seen as ∞.

Dependence Control

Another way of controlling the total number of combinations for which test data will be generated is to control the combinations of arguments for forming new terms. This is referred to as "dependence control". The objective is to specify whether arguments should be varied dependently or independently. Some Systems under Test 13 may have one or more constructors with a plurality of arguments. In such cases it is possible to obtain adequate coverage without varying all of the arguments in the construction of terms. The combinatorial completeness can often be relaxed using knowledge of test experts In one-way coverage, the completely independent exhaustion of argument domains is facilitated by a dedicated coverage criterion, which requires that each argument term appears at least once in a datum for the constructor in question.

$T \subseteq T_\Sigma(\sigma)$ achieves one-way coverage of
$c: \sigma_1 \times \ldots \times \sigma_n \to \sigma \epsilon \Sigma$ relative to $T_1 \subseteq T\Sigma(\sigma_1), \ldots, T_n \subseteq T\Sigma(\sigma_n)$ if:
$\forall i=1, \ldots, n. \forall t \epsilon T_i. \exists c(t_1, \ldots t_n) \epsilon T. t_i = t$ One-way coverage is justified if dependencies between argument positions are not present in the system under test, or they are negligible in the specific scenario. If necessary, one-way coverage may be further relaxed such that exhaustion of candidate sets is not required for specific argument positions.

In between all-way and one-way coverage, there is multi-way coverage. Classic multi-way testing is intended for testing functionality that involves several arguments. For example, two-way testing (or pair-wise testing) assumes that only pair-wise combinations of arguments are to be explored as opposed to all combinations. The justification for limiting combinations in this manner is that functionality tends to branch on the basis of binary conditions that refer to two arguments. In grammar-based testing, this justification may be adopted by relating to the functionality that handles a given constructor by pattern matching or otherwise. For example, some functionality on terms of the form $f(t_1, t_2, t_3)$ might perform parallel traversal on $t_1$ and $t_2$ without depending on $t_3$. Then, it is mandatory to exhaust combinations for $t_1$ and $t_2$, while it is acceptable to exhaust $t_3$ independently. This case results in two-way coverage for $t_1$, $t_2$ and one-way coverage for $t_3$.

A set of parameters $o_c$ may be introduced into the algorithm for each constructor c. The parameters affect the workings of combine (c, kids, len). When c is of arity n, a valid specification $o_c$ must be a subset of $\mathcal{P}(\{1, \ldots, n\})$, where $\mathcal{P}(\bullet)$ is the power-set constructor (a power set is a new set whose elements are the subsets of the original set), Each element in $o_c$ enumerates indexes of arguments for which combinations need to be considered.

For instance, the aforementioned example of $f(t_1, t_2, t_3)$ with two-way coverage for $t_1$ and $t_2$ vs. one-way coverage for $t_3$ would be specified as $\{\{1, 2\}, \{3\}\}$. Here are representative specifications for the general case with n arguments, complete with their intended meanings:

1. $\{\{1, \ldots, n\}\}$: all-way coverage.
2. $\{\{1\}, \ldots, \{n\}\}$: one-way coverage with exhaustion of all components.
3. $\theta$: no exhaustion of any argument required.
4. $\{\{1, 2\}, \ldots, \{1, n\}, \{2, 3\}, \ldots, \{2, n\}, \ldots, \{n-1, n\}\}$: two-way coverage.

This scheme makes sure that all forms of multi-way coverage can be specified. Also, by leaving out certain components in $O_c$, they will be ignored for the combinatorial exploration. The default for an unspecified parameter $O_c$ is the full Cartesian product. Minimality of the specifications $o_c$ is required such that $$\forall x, y \in O_c \cdot x \subset y$$

Options (1.)-(3.) are readily implemented. Computing minimum sets for pair-wise coverage (i.e., option (4.)), or more generally—multi-way coverage—is expensive, but one can employ efficient strategies for near-to-minimum test sets.

Construction Control Construction control is a control mechanism that allows the test engineer to customize term construction through conditions and computations. Construction control provides expressiveness similar to attribute grammars. By using construction control, the test engineer is able to semantically constrain test-data generation and to complete test data into test cases such that additional data is computed by a test oracle (A test oracle is a source of expected results for a test case) and attached to the constructed terms. Conditions and computations are evaluated during bottom-up data generation as opposed to an extra phase so that 'invalid' terms are eliminated early on—before they engage in new combinations and thereby cause explosion. The early evaluation of computations allows conditions to take advantage of the extra attributes. Some of the previously described control mechanisms may be encoded through construction control. For instance, computations may be used to compute depths as attributes to be attached to terms, while term construction would be guarded by a condition that enforced the depth limit for all sorts and constructor arguments. A native implementation of depth control is simply more efficient.

Conditions and computations are associated to constructors. Given a condition (e.g. a predicate) $p_c$ for a constructor c, both of arity n, term construction $c(x_1, \ldots x_n)$ is guarded by $p_c(x_1, \ldots x_n)$. Given a computation (e.g. a function) $f_c$ for a constructor $$c: \sigma_1 \times \ldots \times \sigma_n \to \sigma_0$$

is of the following type:

$$f_c: (\sigma_1 \times A_{\sigma_1}) \times \ldots \times (\sigma_n \times A_{\sigma_n}) \to A_{\sigma_0}$$

Here, $A_\sigma$ is a domain that describes the attribute type for terms of sort $\sigma$. The function observes argument terms and attributes, and computes an attribute value for the newly constructed term. Purely synthesized attribute grammars are assumed to enable immediate completion of computations and conditions. Consequently, no expensive closures are constructed, and both conditions and computation may effectively narrow down the combinatorial search space. Some examples of attributes may include:

Expression types in the sense of static typing.

The evaluation results with regard to some dynamic semantics.

Complexity measures that are taken into account for combination.

Another refinement that increases generality without causing overhead is to customize term construction such that the proposed candidate is replaced by a different term, or by several terms, or it is rejected altogether. This approach may be implemented with the generalized type of a conditional computation which returns a set of attributed terms:

$$f_c: (\sigma_1 \times A_{\sigma_1}) \times \ldots \times (\sigma_n \times A_{\sigma_n}) \to \mathcal{P}(\sigma_0 A_{\sigma_0})$$

Another form of computation that the test data generator 17 may provide is to code extra passes over the generated object structures to be part of the serialization process of the in-memory test data to actual test data. Both kinds of computations (attribute grammar-like and serialization-time) may be expressed as functions in a .NET language.

Implementation of the Methodology

The algorithm and methodology described above may be implemented with a test data generator 17 illustrated in FIG. 1. An example of a test data generator 17 is a program implemented in C# (Geno). The input language of test data generator 17 is a hybrid between Extended Backus-Naur Form (EBNF) and algebraic signatures, where constructors and sorts can be annotated with control parameters. EBNF is used to formally define the grammar of a language, so that there is no disagreement or ambiguity as to what is allowed and what is not.

The test data generator 17 accepts a textual data generator description as input and generates C# terms for this language. Depending on its use, the programmer has complete control of the generation of terms. The test data generator 17 allows the programmer to supply generators for the programmer's own tokens. In addition, the test data generator 17 provides significant control of how the data (or strings) are generated. At the core of this data generator grammar are sorts, like Exp, and constructor definitions like Bin (Exp, Bop, Exp), Una (Uop,Exp) or constant constructors like "+" or "0".

The test data generator 17 is exposed as a class library to C# programmers. The constructor for the test data generator 17 takes a string and a flag. If the flag is FromFile, the string is interpreted as a file name and the file is read, otherwise it takes the string as containing the grammar. Next, the generator has to be compiled into an internal form by calling initialize. Initialize takes 3 arguments, a verbose level, the sort for which program engineer wants to generate terms and the depth. Now users can simply consume a term at a time by using a for each loop.

One simple application for the test data generator 17 may be expressed as follows:

```
using System.IO;
using Geno;
class GenoMain {
    public static void Main (string[] args){
        Geno geno = new Geno(Geno.FromFile, "Exp.geno");
        if (geno.Initialize(0, "Exp", 4)
            foreach(Term t in geno)
                Console.WriteLine(" >>" + t);
    }
}
```

When code is executed the test data generator 17 will generate all (pairwise) combinations of Exp terms up to depth 4, as shown below.

```
>>Lit-0<2>:1("0")
>>Lit-1<2>:1("1")
>>Bin-2<3>:2(Lit-0<2>:1("0"), "+", Lit-0<2>:1("0"))
>>Bin-3<3>:2(Lit-1<2>:1("1"), "+", Lit-0<2>:1("0"))
>>Bin-4<3>:2(Lit-0<2>:1("0"), "+", Lit-1<2>:1("1"))
>>Bin-5<3>:2(Lit-1<2>:1("1"), "+", Lit-1<2>:1("1"))
>>Una-6<3>:2("−", Lit-0<2>:1("0"))
>>Una-7<3>:2("−", Lit-1<2>:1("1"))
>>Bin-8<4>:3(Bin-2<3>:2(Lit-0<2>:1("0"), "+", Lit-
  0<2>:1("0")), "+", Lit-0<2>:1("0"))
>>Bin-9<4>:3(Bin-3<3>:2(Lit-1<2>:1("1"), "+", Lit-
  0<2>:1("0")), "+", Lit-0<2>:1("0"))
...
>>Una-22<4>:3("−", Bin-4<3>:2(Lit-0<2>:1("0"), "+", Lit-
  1<2>:1("1")))
>>Una-23<4>:3("−", Bin-5<3>:2(Lit-1<2>:1("1"), "+", Lit-
  1<2>:1("1")))
>>Una-24<4>:3("−", Una-6<3>:2("−", Lit-0<2>:1("0")))
>>Una-25<4>:3("−", Una-7<3>:2("−", Lit-1<2>:1("1")))
```

Each non base term (i.e. a term that is deeper than 1) gets information attached to it. Let's look at the last one: The outer term "Una" has a sequence number of 25 (meaning it is the 25th term that is generated), it has a depth of 4, it contains 3 recursive unfoldings of expressions. Its arguments are the unary operator "−" and another Una term with sequence number 7, depth 3 and recursive depth 2, etc. The generation of terms can be controlled by using custom attributes on sorts and constructors. For example, the growth of the right argument of a binary expression may be restricted as follows:

Exp
   =Bin (Exp, Bop, [MaxRecDepth=2] Exp
   | Una (Uop,Exp)
   | Lit (Int);
. . .

In that case, test data generator 17 generates only binary terms where the right arguments have the maximum recursive depth of 3.

A data generation description consists of a set of sort definitions that describe the lexical and syntactical structure of a language as well as its generator attributes. The vocabulary of an exemplary test data generator 17 may use identifiers, strings and numbers as follows:

ident=letter{letter|digit|underline}.
number=digit{digit}.
string=doublequote{nondoublequote} doublequote.
char=singlequote nonsinglequote singlequote.
external=backquote
   letter{letter|digit|underline|dot}backquote.

Upper case letters are distinct from lower case letters. Identifiers, numbers, strings and char's are defined as usual, but without escape characters. External identifiers are C# qualified names. They are used to import C# values into the term generation process or they represent C# methods that are used as filters.

For example:

| | |
|---|---|
| PolicyExpr, Bin, tail | identifiers |
| 1, 2, 01, 122 | numbers |
| , "abc", "a" | strings |
| 'a', 'b', '9' | chars |
| 'External.Joe.Values' | external names |

Comments are enclosed in "/*" and "*/" and may be nested. Alternatively line comments in the form of "//" are supported as well.

The test data generator 17 is used to generate sorts and constructors. A sort grammar is made up of a sequence of sort definitions. A sort introduces a domain that contains values. Sorts contain a non empty sequence of constructor definitions. Each constructor contains a possibly empty sequence of argument sort definition. Constructors define values. Sorts may be given in any order. For all argument sorts a sort definition must exist. There can be more than one definition for a sort—in this case, only the later is taken.

Various forms of constructors are supported. Constant constructors are defined by only giving a literal or a (parameterless) identifier. Constants can also be defined in C#. In this case the C# sort must have a single constructor that must be an external name. Sequences are natively supported. A sequence sort must have a single constructor which has a single argument sort which is suffixed with '*'. If a sort defines more that one constructor then each constructor (identifier) or literal must be different. In C# this would be coded as follows"

```
GENO
    = SORT { SORT } .
SORT
    = [ATTRIBUTES] identifier "=" CONSTRUCTOR { "|"
CONSTRUCTOR } ";".
CONSTRUCTOR
    = ATTRIBUTES ( identifier [ ARGUMENTS ] | ARGUMENTS |
LITERAL ).
ARGUMENTS
    = "(" [ ARGUMENTSORT ( "*" | "," ARGUMENTSORTS ) ] ")".
ARGUMENTSORTS
    = ARGUMENTSORT { "," ARGUMENTSORT}.
ARGUMENTSORT
    = [ATTRIBUTES] identifier.
LITERAL
    = string | char | number | external.
```

For example:

| | |
|---|---|
| Int = 1 | 2 | 3; | Some integers |
| Char = 'a' | 'b' | 'c'; | Some chars |
| String = "hello" | "world"; | Some strings |
| ExternalNumbers = 'External.Class.Numbers' | Externally defined numbers |
| Person = (Age, Name); | Product |
| Sequence = (Person*); | Sequence |
| Tree = Nil | Node(Tree, Tree); | Sum-of-products |

In the exemplary test data generator 17, Sorts, constructors and constructor arguments can be augmented by custom attributes controlling the explosion. As in C\# attributes precede the entity for which they are defined, as follows:

```
ATTRIBUTES
  = "[" ATTRIBUTE {"," ATTRIBUTE } "]" .
ATTRIBUTE
  = identifier [ "=" LITERAL | "(" LITERAL { "," LITERAL }
")" ] .
```

The following attributes may be defined
Sorts—depth control
Depth control—MaxDepth: limit maximum depth of terms; not just at the top-level
Recursion control—MaxRecDepth: limit nested applications of recursive constructors
Balance control—MaxRecUnbalance: limit the preceding levels from which to reuse to terms (generation not yet implemented)
Constructors—combination control
Oneway—zip arguments
Twoway—pairwise combination of arguments (default)
Order Sequence control—Unordered: ignore order of appearance (if possible)
Duplicate control—NoDuplicates: ignore duplicates (if possible)
Sequence control—MinLength, Maxlength:Minimal and maximal length of sequence
Construction control—Filter: enforce context conditions, transform term
Default values for these attributes are
MaxDepth=int.MaxValue;
MaxRecDepth=int.MaxValue;
MinLength=1;
MaxLength=2;
MaxRecUnbalance=int.MaxValue;
Oneway=false; //i.e. Twoway is default
NoDuplicates=false;
Unordered=false;

Geno is provided with an interpreter with the following command line usage:

Geno Version 0.1 Copyright (c) Microsoft 2003

Geno [-S sort] [-D depth] [-V level] file
  where
  -S sort: describes the sort (a string) to generate
  -D depth: describes the maximal depth (a number) of a term
  -V level: verbose level (a number)
  -F: force generation (test timing option)
  -p: parse only (test parsing option)
  -H: this message
  file: describes the input file When Test Data Generator 17 is called only with the input file it will take the first sort of the input file as the root sort and it will generate terms only the minimal depths that is needed to generate a root sort. For example for Exp.geno the maximal depth is two. Typically Geno is started with just geno file -V n, where n is the number of terms the programmer would like to see. Geno also writes a protocol, called listing.txt, that you will find in the user's current directory listing.txt. Its output is dependent on the verbose level.

The described grammar-based testing approach has been applied in the mean time to a number of problems, in particular, to differential testing, stress testing and conformance testing of language implementations and virtual processors (virtual machines). The test data generator has been used to generate test-data from problem-specific grammars for Tosca, XPath, XML Schema, the MicrosoftWindows Card runtime environment, the Web Service Policy Framework, and others. Measurements for some applications of Geno are shown in Table 4 below.

EXAMPLE

Testing an Object Serialization Framework

Serialization is the process of converting an object into a form that can be readily transported. For example, serialization enables the transport of object structures over the Internet using HTTP between a client and a server. On the other end, de-serialization reconstructs the object from the stream. The system under test was related to testing a framework for object serialization, i.e., a framework that supports conversion of in-memory object instances into a form that can be readily transported over the network or stored persistently so that these instances can be deserialized at some different location in a distributed system, or at some later point in time. The specific technology under test is 'data contracts' as part of Microsoft's WCF. The specific design of the tested serializer allows the user to specify the mapping of CLR entities to XSDs entities via custom attributes on C# classes. The testing challenge is to generate legal C# classes with custom attributes that represent legal XSDs, and to generate instances of these.

The framework allows one to map classes (CLR types) to XML schemas and to serialize object instances as XML. Data contracts also support some sort of loose coupling. The overall testing problem is to validate the proper declaration of data contracts by CLR types, the proper mapping of CLR types (with valid data contracts) to XML schemas, the proper serialization and de-serialization of object instances including roundtripping scenarios. (There are also numerous requirements regarding the expected behavior in case of invalid schemas or CLR types.) Essentially, the test data generator is used in this project to generate classes like the following:

```
[DataContract]
public class Car : IUnknownSerializationData {
    [DataMember]
    public string Model;
    [DataMember]
    public string Maker;
    [DataMember(Name="HP", VersionAdded=2,
    IsOptional=true)]
    public int Horsepower;
    public virtual UnknownSerializationData UnknownData {get {
    ... } set { ... } // omitted
    }
}
```

In these classes, specific custom attributes are used to inform the serialization framework. The DataContract attribute expresses that the class can be serialized. Likewise, fields and properties are tagged for serialization using the DataMember attribute. There is a default mapping from CLR names to XML names, but the name mapping can be customized; see the attribute Name="HP". There are several other attributes and features related to versioning and loose coupling; for example, the implementation of IUnknownSerializationData which supports round-tripping of XML data that is not understood by a given CLR type. The project delivered 7 test data generator grammars for different validation aspects and different feature sets. The baseline grammar, from which all other grammars are derived by slight extensions, factoring and annotation had 21 nonterminals and 34 productions ("alternatives"). Eventually, these grammars generated about 200.000 well justified test cases.

Table 4 summarizes the results obtained on a Compaq OPTIPLEX GX280, Pentium 4, 3.2 Ghz, 2 Gigabyte of memory. The 'uncontrolled' measurements combinatorially exhaust the grammar, except that the length of lists must be in the range 0, 1, 2. The maximum depth before proper explosion ('out of memory') is shown. In theWindowsCard case, the test set is actual finite; so a "5." means that test-data generation has converged for depth 5. The depth for Tosca is insufficient to explore expression forms in all possible contexts. The depth for XPath indicates that control is indispensable for generating non-trivial selector expressions. The 'controlled' measurements take advantage of problem-specific grammar annotations. In the case of Tosca, the corresponding test-data set achieves branch-coverage of a reference implementation. In the case of Data Contract, all essential variation points of the serialization framework are exercised for up to three classes with up to three fields each, complete with the necessary attributes and interface implementations.

TABLE 4

| Status | Grammar | Depth | Time | Terms | Memory |
|---|---|---|---|---|---|
| Uncontrolled | WindowsCard | 5.. | 0.05 | 7.657 | 1.489.572 |
| | WS Policy | 5 | 1.57 | 313.041 | 41.121.608 |
| | Tosca | 4 | 0.08 | 27.909 | 2.737.204 |
| | XPath | 2 | 0.09 | 22.986 | 2.218.004 |
| Controlled | Tosca | 8 | 0.14 | 42.210 | 5.669.616 |
| | Data Contract | 6 | 22.33 | 2.576.177 | 365.881.216 |

The various systems, methods, and techniques described herein may be implemented with hardware or software or, where appropriate, with a combination of both. Thus, the methods and apparatus of the present invention, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. In the case of program code execution on programmable computers, the computer will generally include a processor, a storage medium readable by the processor (including volatile and non-volatile memory and/or storage elements), at least one input device, and at least one output device. One or more programs are preferably implemented in a high level procedural or object oriented programming language to communicate with a computer system. However, the program(s) can be implemented in assembly or machine language, if desired. In any case, the language may be a compiled or interpreted language, and combined with hardware implementations.

The methods and apparatus of the present invention may also be embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, a video recorder or the like, the machine becomes an apparatus for practicing the invention. When implemented on a general-purpose processor, the program code combines with the processor to provide a unique apparatus that operates to perform the indexing functionality of the present invention.

While the present invention has been described in connection with the preferred embodiments of the various figures, it is to be understood that other similar embodiments may be used or modifications and additions may be made to the described embodiment for performing the same function of the present invention without deviating there from. Furthermore, it should be emphasized that a variety of computer platforms, including handheld device operating systems and other application-specific hardware/software interface systems, are herein contemplated, especially as the number of wireless networked devices continues to proliferate. Therefore, the present invention should not be limited to any single embodiment, but rather construed in breadth and scope in accordance with the appended claims.

Finally, the disclosed embodiments described herein may be adapted for use in other processor architectures, computer-based systems, or system virtualizations, and such embodiments are expressly anticipated by the disclosures made herein and, thus, the present invention should not be limited to specific embodiments described herein but instead construed most broadly.

What is claimed:

1. A method of testing a system having meta-data driven functionality comprising:
    modeling the grammar of the system;
    generating test data in a controlled manner to achieve coverage of the system's grammar by:
        identifying all sorts and constructors associated with the grammar;
        generating a subset of all possible terms that can be constructed from said sorts and constructors; and
        composing test data sets from said terms;
    providing the test data as input to this system; and
    identifying the system errors from the system outputs.

2. The method of claim 1 wherein said element of generating a subset of all possible terms that can be constructed from said sorts and constructors comprises:
    calculating the depth of sorts and constructors associated with the grammar; and
    constructing a plurality of terms over increasing depth up to a predetermined depth.

3. The method of claim 2 further comprising skipping a depth based on a sort specific limit.

4. The method of claim 2 further comprising eliminating the recursive depth of terms of intermediate sorts.

5. The method of claim 2 further comprising limiting the preceding levels from which the terms are reused.

6. The method of claim 2 further comprising limiting the combination of arguments used for forming new terms.

7. The method of claim 2 further comprising attaching at least one condition to a constructor.

8. A system for testing a system having meta-data driven functionality said system comprising at least one subsystem that:
    models the grammar of the system;
    generates test data in a controlled manner to achieve coverage of the system's grammar said subsystem that generates test data further comprising at least one subsystem that:
        identifies all sorts and constructors associated with the grammar;
        generates a subset of all possible terms that can be constructed from said sorts and constructors; and
        composes test data sets from said terms;
    provides the test data as input to this system; and
    identifies the system errors from the system outputs.

9. The system of claim 8 wherein said subsystem that generates a subset of all possible terms that can be constructed from said sorts and constructors comprises at least one subsystem that:
- calculates the depth of sorts and constructors associated with the grammar; and
- constructs a plurality of terms over increasing depth up to a predetermined depth.

10. The system of claim 9 further comprising at least one subsystem that skips a depth based on a sort specific limit.

11. The system of claim 9 further comprising at least one subsystem that eliminates the recursive depth of terms of intermediate sorts.

12. The system of claim 9 further comprising at least one subsystem that limits the preceding levels from which terms are reused.

13. The system of claim 9 further comprising at least one subsystem that limits the combination of arguments used for forming new terms.

14. The system of claim 9 further comprising attaching at least one condition to a constructor.

15. A computer-readable medium for testing a system having meta-data driven functionality said computer-readable medium comprising computer-readable instructions, executable by a computer, to:
- model the grammar of the system;
- generate test data in a controlled manner to achieve coverage of the system's grammar including instructions to:
  - identify all sorts and constructors associated with the grammar;
  - generate a subset of all possible terms that can be constructed from said sorts and constructors; and
  - compose test data sets from said terms;
- provide the test data as input to this system; and
- identify the system errors from the system outputs.

16. The computer-readable medium of claim 15 wherein said instructions to generate a subset of all possible terms that can be constructed from said sorts and constructors comprises instructions to:
- calculate the depth of sorts and constructors associated with the grammar; and
- construct a plurality of terms over increasing depth up to a predetermined depth.

17. The computer-readable medium of claim 16 further comprising instructions to skip a depth based on a sort specific limit.

18. The computer-readable medium of claim 16 further comprising instructions to eliminate the recursive depth of terms of intermediate sorts.

19. The computer-readable medium of claim 16 further comprising instructions to limit the preceding levels from which terms are reused.

20. The computer-readable medium of claim 16 further comprising instructions to limit the combination of arguments used for forming new terms.

* * * * *